(12) United States Patent
Liu et al.

(10) Patent No.: US 10,584,754 B2
(45) Date of Patent: Mar. 10, 2020

(54) LINE REPLACEABLE BRAKE

(71) Applicant: Whippany Actuation Systems LLC, Whippany, NJ (US)

(72) Inventors: Shijie Liu, Morris Plains, NJ (US); Kurt Goldhammer, Long Beach, NJ (US); Phil Demauro, Toms River, NJ (US); Doug Campbell, Martinsville, NJ (US); John Giordano, Boonton, NJ (US); Phil Chivily, Verona, NJ (US)

(73) Assignee: Whippany Actuation Systems LLC, Whippany, NJ (US)

( * ) Notice: Subject to any disclaimer, the term of this patent is extended or adjusted under 35 U.S.C. 154(b) by 163 days.

(21) Appl. No.: 15/708,256

(22) Filed: Sep. 19, 2017

(65) Prior Publication Data

US 2019/0085920 A1    Mar. 21, 2019

(51) Int. Cl.
| | |
|---|---|
| *F16D 65/00* | (2006.01) |
| *F16D 55/36* | (2006.01) |
| *F16D 65/18* | (2006.01) |
| *F16D 66/00* | (2006.01) |
| *F16D 131/00* | (2012.01) |
| *F16D 55/00* | (2006.01) |

(Continued)

(52) U.S. Cl.
CPC ......... *F16D 65/0043* (2013.01); *F16D 55/36* (2013.01); *F16D 65/18* (2013.01); *F16D 66/00* (2013.01); *F16D 66/02* (2013.01); *F16D 2055/0033* (2013.01); *F16D 2121/14* (2013.01); *F16D 2121/20* (2013.01); *F16D 2131/00* (2013.01)

(58) Field of Classification Search
CPC ...... F16D 66/00; F16D 65/0043; F16D 55/36; F16D 2055/0033; F16D 2131/00; B60B 27/00
See application file for complete search history.

(56) References Cited

U.S. PATENT DOCUMENTS 2,700,439 A * 1/1955 Hodgson ................. F16D 55/28
188/171
2,939,551 A * 6/1960 Hansen ................ H02K 7/1023
188/171

(Continued)

FOREIGN PATENT DOCUMENTS

EP    2876325 A2    5/2015

*Primary Examiner* — Thomas J Williams
*Assistant Examiner* — James K Hsiao
(74) *Attorney, Agent, or Firm* — BakerHostetler

(57) ABSTRACT

Actuators can include a line replaceable brake unit including a window for inspecting brake elements. In particular, an actuator system includes a modular brake component having an integral brake housing configured to mount to a motor, wherein the integral brake housing is environmentally sealed; a drive coupling within the integral brake housing configured to mechanically couple with an output shaft of the motor; one or more braking disks arranged in the integral brake housing configured to brake movement of the drive coupling when engaged; an armature in the integral brake housing configured to engage or disengage the one or more braking disks with the drive coupling; and an inspection window through the integral brake housing aligned with at least a portion of the one or more braking disks. A method for implementing an actuator system is disclosed as well.

18 Claims, 5 Drawing Sheets

(51) Int. Cl.
  *F16D 121/14* (2012.01)
  *F16D 121/20* (2012.01)
  *F16D 66/02* (2006.01)

(56) References Cited

U.S. PATENT DOCUMENTS

| | | | | |
|---|---|---|---|---|
| 3,095,068 A * | 6/1963 | Hansen | | F16D 23/12 188/171 |
| 4,095,681 A * | 6/1978 | David | | B66B 5/044 187/352 |
| 4,130,188 A * | 12/1978 | Askew | | F16D 55/28 188/156 |
| 4,170,278 A | 10/1979 | Schubert | | |
| 4,476,965 A * | 10/1984 | Brown, Jr. | | F16D 55/36 188/171 |
| 4,570,758 A * | 2/1986 | Hendricks | | F16D 55/36 188/171 |
| 4,828,077 A * | 5/1989 | Stevens, Jr. | | F16D 55/02 188/163 |
| 5,529,157 A | 6/1996 | Desrochers | | |
| 5,697,473 A * | 12/1997 | Lindner | | F16D 55/28 188/72.3 |
| 6,119,825 A * | 9/2000 | Nisley | | F16D 65/46 188/161 |
| 6,293,372 B1 * | 9/2001 | Lorenz | | F16D 65/0006 188/171 |
| 6,311,554 B1 | 11/2001 | Walpole | | |
| 7,100,747 B1 * | 9/2006 | Conrad | | H02K 7/1025 188/162 |
| 7,309,941 B2 * | 12/2007 | Murota | | H02K 7/116 310/209 |
| 7,686,145 B2 * | 3/2010 | Akagi | | B60L 7/003 180/65.51 |
| 7,870,917 B2 * | 1/2011 | Akagi | | A61G 5/045 180/65.1 |
| 2001/0052440 A1 * | 12/2001 | Rimann | | B66D 5/14 188/216 |
| 2002/0185342 A1 * | 12/2002 | Bausch | | B60T 13/04 188/161 |
| 2003/0150674 A1 * | 8/2003 | Daigre | | B66D 5/14 188/71.5 |
| 2006/0102436 A1 * | 5/2006 | Haydon | | F16D 55/36 188/72.7 |
| 2006/0249338 A1 * | 11/2006 | Daigre | | F16D 55/36 188/71.5 |
| 2007/0187192 A1 * | 8/2007 | Anderson | | B60T 13/741 188/158 |
| 2007/0210661 A1 * | 9/2007 | Schmidt | | H02K 5/06 310/90 |
| 2008/0128224 A1 | 6/2008 | Ruopp | | |
| 2009/0235783 A1 * | 9/2009 | Duane | | B23Q 16/102 74/813 C |
| 2010/0123278 A1 * | 5/2010 | Tatsuda | | B23Q 16/102 269/57 |
| 2010/0175505 A1 * | 7/2010 | Tatsuda | | B23Q 16/102 74/813 L |
| 2012/0011964 A1 * | 1/2012 | Tatsuda | | B23Q 1/525 74/813 R |
| 2013/0062928 A1 | 3/2013 | Crawford et al. | | |
| 2015/0167760 A1 * | 6/2015 | Paweletz | | B24B 23/028 188/161 |
| 2015/0292580 A1 * | 10/2015 | Fichtner-Pflaum | | F16D 55/36 188/161 |
| 2016/0039277 A1 * | 2/2016 | Falls | | B60K 1/02 180/62 |
| 2016/0243660 A1 * | 8/2016 | Nishimura | | B23Q 16/105 |
| 2016/0377135 A1 * | 12/2016 | Ziskovsky | | B60T 1/062 188/170 |
| 2017/0023145 A1 * | 1/2017 | Garrone | | F16K 31/047 |
| 2018/0023641 A1 * | 1/2018 | Cole, Jr. | | B66D 5/14 188/71.5 |

* cited by examiner

LINE REPLACEABLE BRAKE

FIELD OF THE DISCLOSURE

The disclosure relates to brake systems for use with actuators or motors. More particularly, the disclosure relates to line-replaceable modular brake systems for use with actuators or motors.

BACKGROUND OF THE DISCLOSURE

A vast number of electromechanical actuators are in use in an even vaster number of systems. Many of these systems include brake elements for stopping the actuator and preventing movement of actuator parts from an orientation when stopped.

Depending on the actuator use, braking elements may be the first to need replacement from wear. However, this is difficult to forecast and determine. Verification of wear or damage frequently requires removal of the actuator from an associated system with subsequent disassembly to access brake elements. This is a time-consuming process resulting in extended downtime for the system. When disassembled, the brake elements and/or actuator may be exposed to foreign object debris and/or may be a source of foreign object debris. Such contaminants can pose significant risk to the actuator or systems associated therewith along with other systems such as vehicles (e.g., aircraft).

Actuators are frequently designed for a particular system or developed with low-impact form factors to maximize the number of systems in which they can be integrated. Further, systems integrating actuators must include mechanical and electrical interfaces to couple, power, and utilize the actuator. Because of proprietary arrangements or small footprint configurations, redesign of actuators, or even elements thereof such as braking subsystems, can create substantial problems for designers.

Accordingly, brake systems which are interoperable with existing systems while mitigating maintenance difficulties would be beneficial.

SUMMARY OF THE DISCLOSURE

The foregoing needs are met, to a great extent, by the disclosure, wherein in one aspect a line replaceable brake is disclosed.

In accordance with one aspect, an actuator system includes a modular brake component having an integral brake housing configured to mount to a motor, wherein the integral brake housing is environmentally sealed; a drive coupling within the integral brake housing configured to mechanically couple with an output shaft of the motor; one or more braking disks arranged in the integral brake housing configured to brake movement of the drive coupling when engaged; and an armature in the integral brake housing configured to engage or disengage the one or more braking disks with the drive coupling.

In accordance with one aspect, a method for implementing an actuator system includes providing a modular brake component having an integral brake housing configured to mount to a motor; providing a drive coupling within the integral brake housing configured to mechanically couple with an output shaft of the motor; visually inspecting a braking element through a window in the integral brake housing; determining the braking element is worn; releasing a captive hardware element to dismount the modular brake component from the motor; and installing a new or refurbished modular brake component to the motor.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
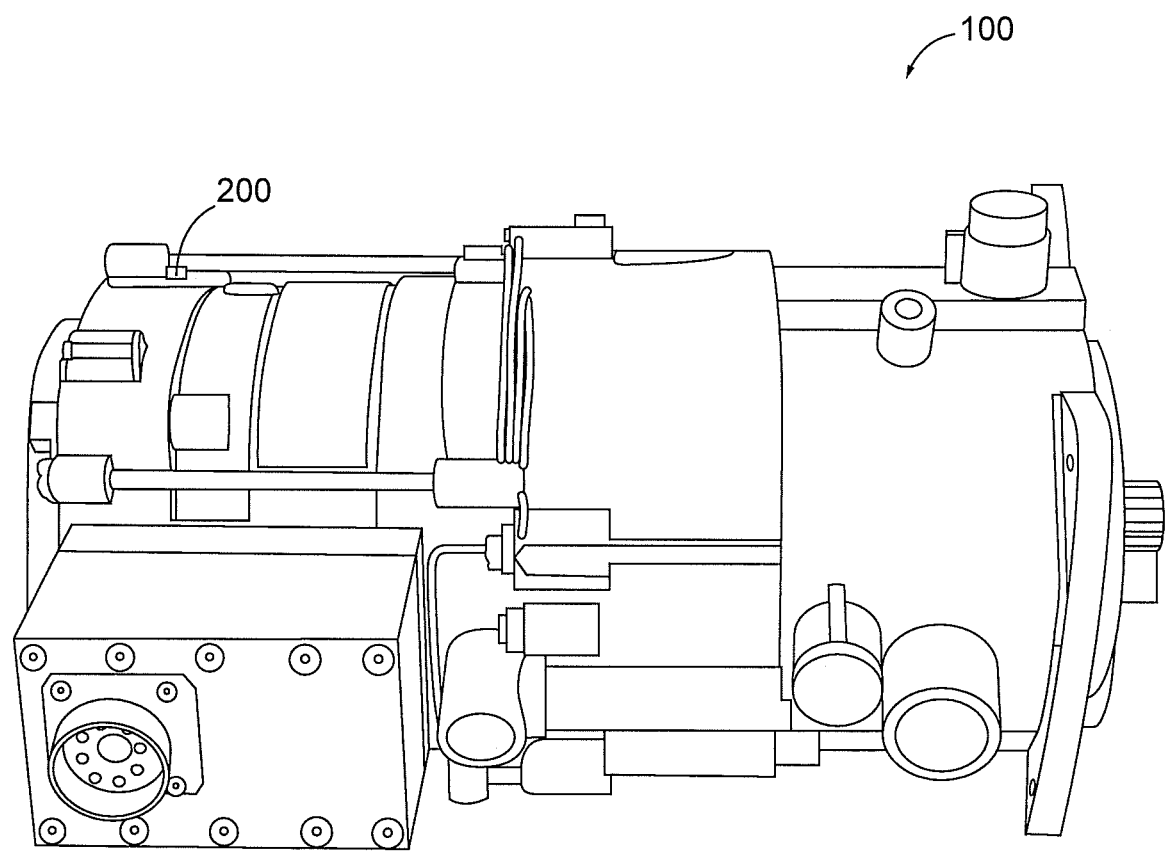
FIG. 1 illustrates an example aspect of an actuator including a line replaceable brake unit disclosed herein.

The disclosures herein concern a line replaceable brake including aspects not previously available to brake modules for actuators.

In varying aspects, the line replaceable brake disclosed is compatible with various legacy actuators. Many motors for systems in use cannot be redesigned to have an integral brake and to meet new and/or more demanding requirements without significant overhaul of the entire system due to, e.g., parameters concerning size, shape, weight, interfaces, and others. Accordingly, it may be beneficial for compatible improved components or modules to conform to existing mechanical, electrical, and other interfaces. Compatible components can also avoid interfering with other operations, as can occur when new electronics or magnets are added, or when weight or size is increased. In many systems, such constraints limit possibilities for dramatic changes to form factor or operation of subcomponents such as actuators and/or associated brakes.

The inability to easily reconfigure subcomponents of a system may cause inefficiencies. In legacy systems, if one component or module possesses a service life shorter than other elements of the motor or system, it may require the entire system be brought offline and disassembled to replace the worn portions even if other portions are serviceable. For example, systems not employing the disclosed line replaceable brake may utilize an integral brake which cannot be removed and reinstalled as a modular "add-on," and cannot be inspected without removal and disassembly of the entire actuator. Because it is difficult to forecast when such subcomponents will require service or fail, an irregular maintenance schedule and frequent premature removal of subcomponents results. If the subcomponent is removed or fails when the larger system is needed, this can cause significant organizational interruptions.

In a specific example, a motor described can be a surface control actuator in an aircraft. Aircraft include various actuators, some of which are used as backups and back driven when unneeded. However, as aircraft are updated and redesigned, such actuators may be repurposed as primary drive systems for controls such as those which trim the surface during flight. The repurposed actuator can include a brake which stops the actuator when applied and holds the drive's position until disengaged. Because the brake was originally designed as a fail-safe brake for backup actuators, the new use or application may subject the brake to many times the duty cycles projected based on the originally-conceived use or application. This causes an increased rate of wear based on the increased number of duty cycles and higher operating temperatures (consequent to duty cycles which do not allow heat to fully dissipate).

This excessive wear can create a number of issues with system function. For example, when braking elements are worn, the actuator and associated drive(s) are subject to excessive coast and/or position error (e.g., drive continues turning when signaled to stop), low holding torque and/or position drift in coupled elements (e.g., drive does not remain fixed and fix associated components when braked), and high release voltage (e.g., more power required to disengage brake which can be a result of, e.g., the air gap in the brake exceeding what the electromagnet force can disengage under normal voltage). In systems without the disclosed line replaceable brake, inspections for wear require removal of the actuator from the aircraft, grounding it. If the brake system is unserviceable, maintenance personnel disassemble the actuator to replace the worn portions. This delays reinstallation of the actuator and exposes the integral brake, actuator, other elements, the aircraft associated with the actuator, and other aircraft to the risk of exposure to foreign object debris.

To address these concerns, the disclosed line replaceable brake, which can be adapted to any motor utilizing such a brake (e.g., a failsafe brake), was developed. Aspects of the new brake include a window allowing viewing of braking elements for in-field inspection. The window may be aligned with the brake armature and brake core so that the brake disks/pad wear can be easily inspected. Additional aspects include environmental sealing of the line replaceable brake and actuator modules, and the line replaceable brake utilizing captive hardware and matched mounting features for rapid and contaminant free removal and installation. Other aspects can include the use of specialized bearings and locking nuts to retain a preset position of the line replaceable brake drive to expedite mounting onto a motor.

The disclosure further provides the ability to remove and replace the brake easily and rapidly without risk of foreign object debris. In aviation, foreign object debris (FOD) is any substance, debris, or article alien to a vehicle or system which could potentially cause damage. Modern jet engines can suffer major damage from even small objects being sucked into the engine. Internationally, FOD costs the aviation industry US$13 billion per year in direct plus indirect costs. The indirect costs are as much as ten times the direct cost value, representing delays, aircraft changes, incurred fuel costs, unscheduled maintenance, and the like and causes expensive, significant damage to aircraft and parts and death and injury to workers, pilots and passengers.

The disclosed line replaceable brake was determined to be the best approach to accomplish the goal of meeting Service Life design requirements without removal of the actuator assembly from the aircraft. Other solutions such as the use of electronics also would add more weight, envelope, cost, design risk, schedule, and reduced reliability. The disclosure moreover solves a problem of eliminating the need to remove the actuator from the aircraft for brake servicing.

The disclosed line replaceable brake enables the inspection capability for brake wear through an access (such as a window) without removing the brake assembly or the entire surface control actuator from the aircraft. The disclosure also provides the ability to monitor wear, which prevents brake failure and aircraft downtime; which offers significant time and cost savings for the "aircraft operator" while satisfying all the goals of these challenging requirements.

As explained in more detail herein, the disclosure accomplishes an optimized use of friction material, while reducing the potential for brake failure by adding the inspection access, as compared to the conventional cap enclosed brake design. The disclosure also reduces the risk of introducing any FOD into the Surface control actuator or aircraft by enclosing (sealing) the brake and providing captivated mounting hardware.

While some aspects herein are described in conjunction with actuators or motors, such components are not necessary in all systems disclosed, and additional components may be present in others. In aspects, a replaceable brake module could be provided with a mechanical interface (e.g., a gearbox) to an actuator, motor, or other element without including the actuator, motor, or other element.

The disclosure will now be described with reference to the drawing figures, in which like reference numerals refer to like parts throughout.

FIG. 1 illustrates an example actuator 100 including a line replaceable brake 200. FIG. 1 is provided for context only, and should not be considered limiting in terms of the model of the actuator 100 depicted, the model of the line replaceable brake 200 depicted, and/or the applications, form factors, or specifications of either.

The example actuator 100 can include a three phase alternating current induction motor, a two stage planetary gear train, a torque limiter, and a solenoid clutch (e.g., a 28 volt direct current clutch). However, other implementations of the actuator 100 are contemplated as well that include one or more of a different operating power, a different motor, a different transmission type, and the like. Moreover, the actuator may have fewer or more components as described above. The actuator may further include an actuator output. The actuator output may be configured with a rotational motion, a linear motion, or other motion. In one aspect, the actuator output may be a rotating shaft that may include a splined surface. The actuator 100 may further include electrical connections for providing control and/or power to the actuator 100. In one aspect, the actuator 100 may further include electrical connections for providing control and/or power to the actuator 100 and the line replaceable brake 200. In one aspect, the electrical connections may include a receptacle for receiving a plug. In one aspect, the actuator 100 may further include mounting flanges on one end thereof. The opposite end of the actuator 100 may be a free end that is freely accessible by maintenance personnel. The mounting flanges may include mounting holes configured to receive a mechanical fastener for attaching the actuator 100 to an aircraft system. In one aspect, the actuator 100 may be configured to actuate an aircraft component for an aircraft. In one aspect, the actuator 100 may be configured to actuate a flight surface for an aircraft. In one aspect the actuator 100 may be configured to actuate a flight surface for an aircraft including one of an aileron, an elevator, leading-edge flaps, leading-edge slots, ground spoilers, an inboard flap, an inboard aileron, an inboard aileron tab, an outboard flap, a balance tab, an outboard aileron, a flight spoiler, a trim tab, slats, air brakes, an elevator trim, control horn, rudder trim, aileron trim, and the like.

The line replaceable brake 200 can be an integral electromechanical fail safe brake. As suggested, a failsafe brake is used to stop a motor in time to meet a certain position as commanded, or in the event of a failure event, and otherwise hold an output element (e.g., drive shaft) in a given orientation, position, and/or rotational angle. In one aspect, the line replaceable brake 200 is configured to be easily removed from the actuator 100 for replacement. In particular, the line replaceable brake 200 may be configured with a modular construction. In one aspect, this modular construction may be configured as a single component that can be easily removed from the actuator 100 and replaced with a new or refurbished line replaceable brake 200 as needed. In one aspect, the line replaceable brake 200 may be attached to the free end of the actuator 100. It is further contemplated that the line replaceable brake 200 may also be implemented as a non-failsafe brake allowing rotation after failure if a particular design requires this functionality.

Figure 2A:
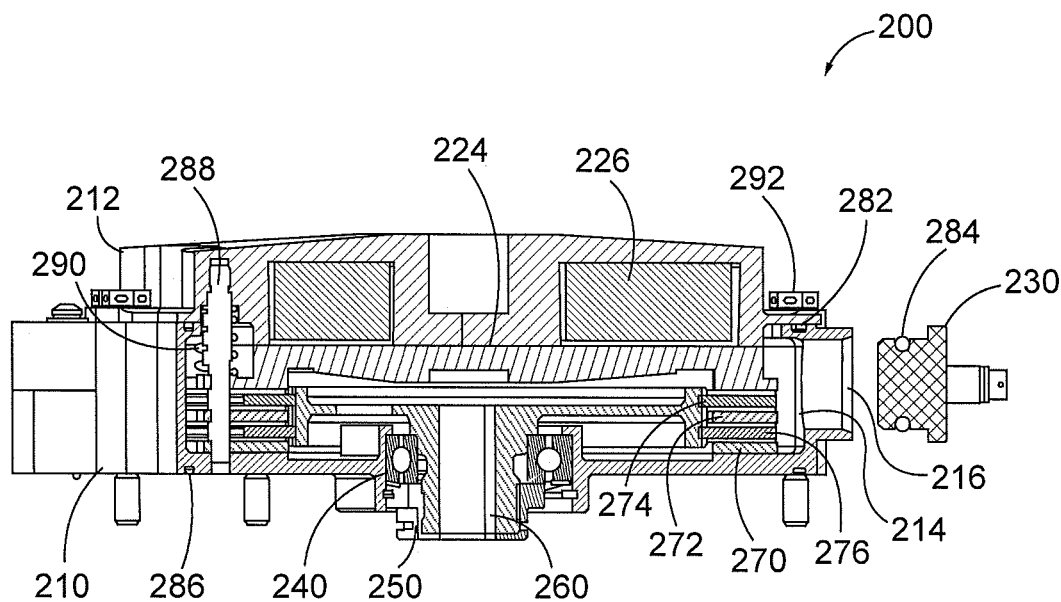
FIGS. 2A, 2B, 2C, 2D, 2E, 2F, 2G, and 2H illustrate an example aspect of a line replaceable brake unit disclosed herein.
Figure 2B:
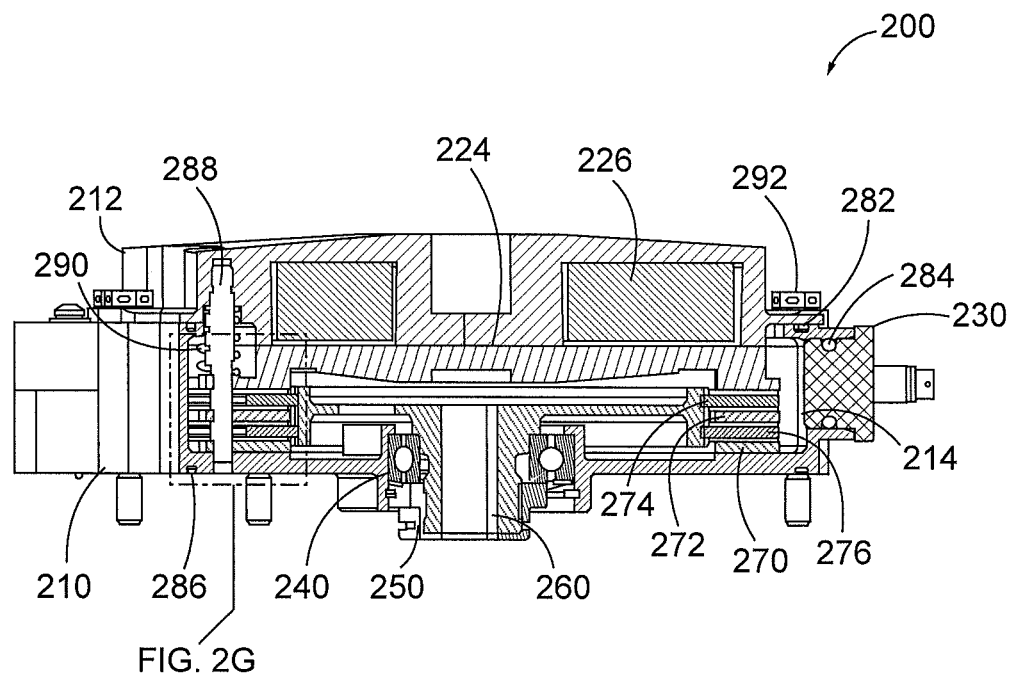
Figure 2C:
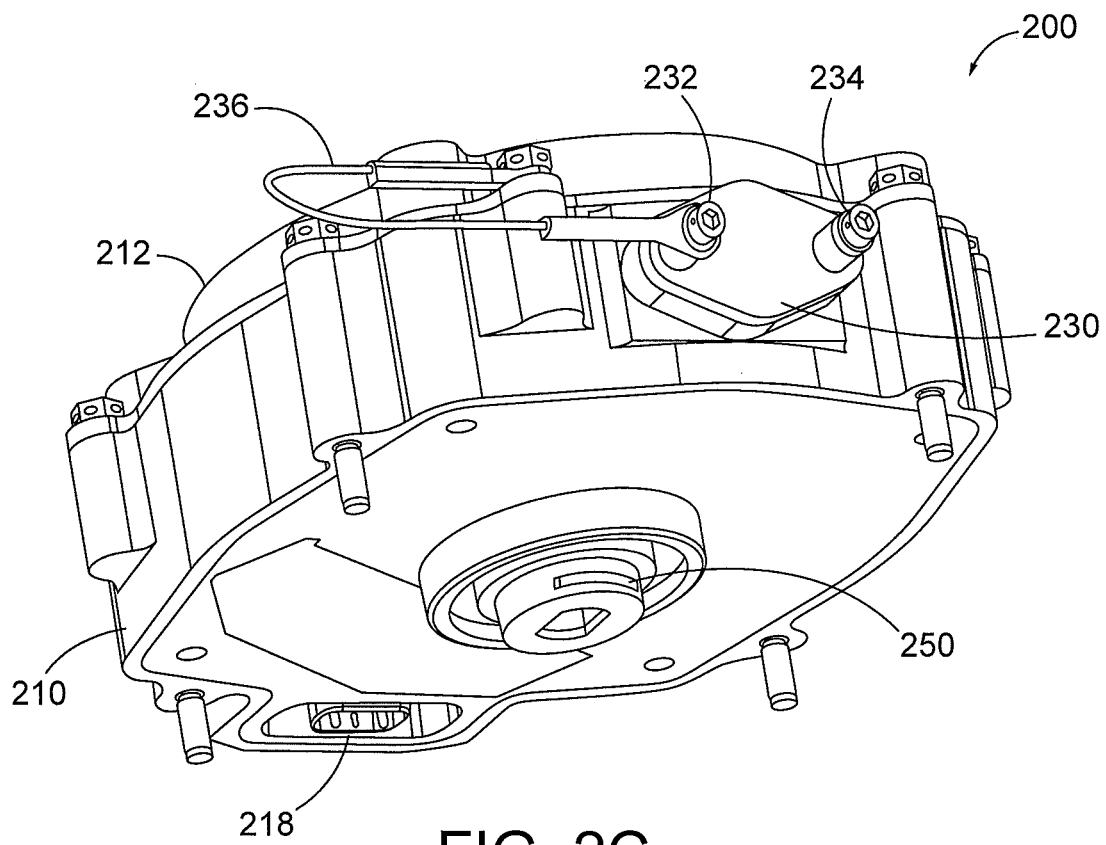
Figure 2D:
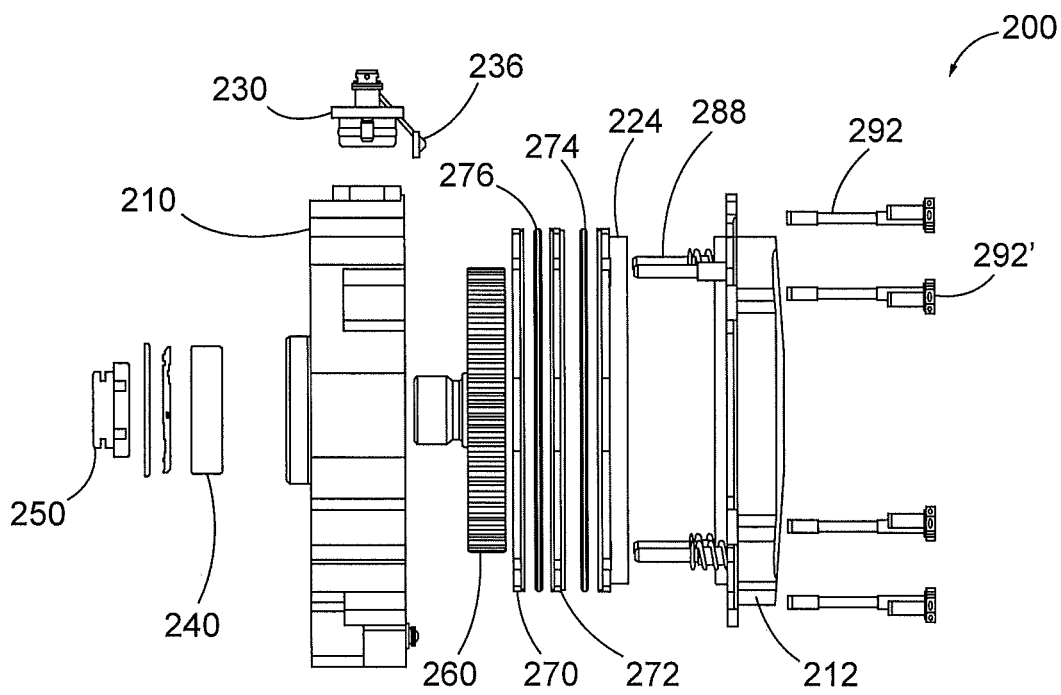
Figure 2E:
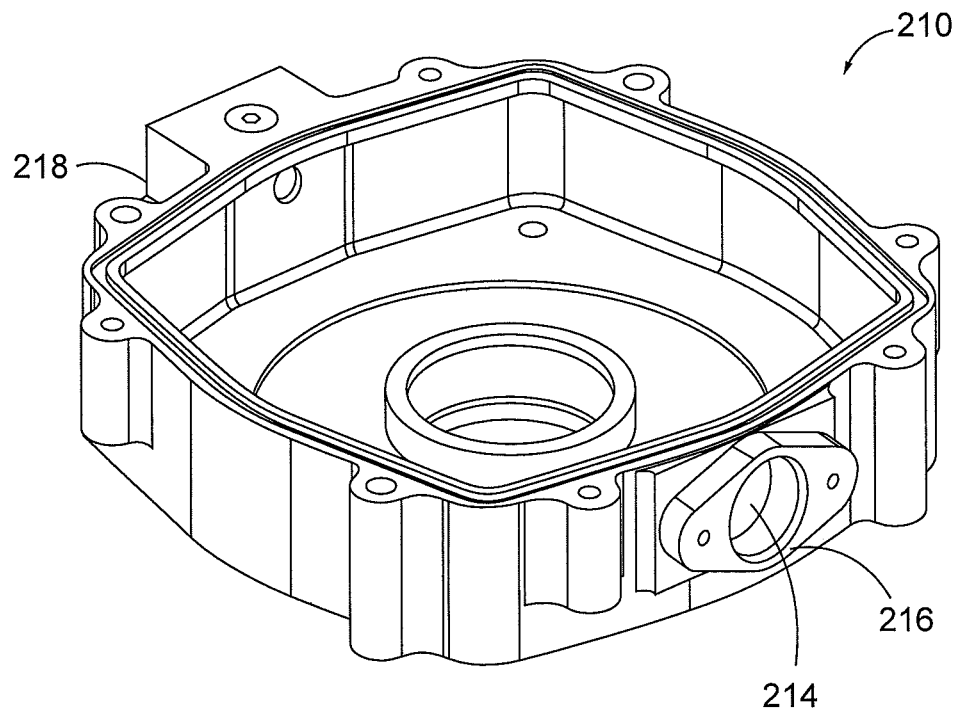
Figure 2F:
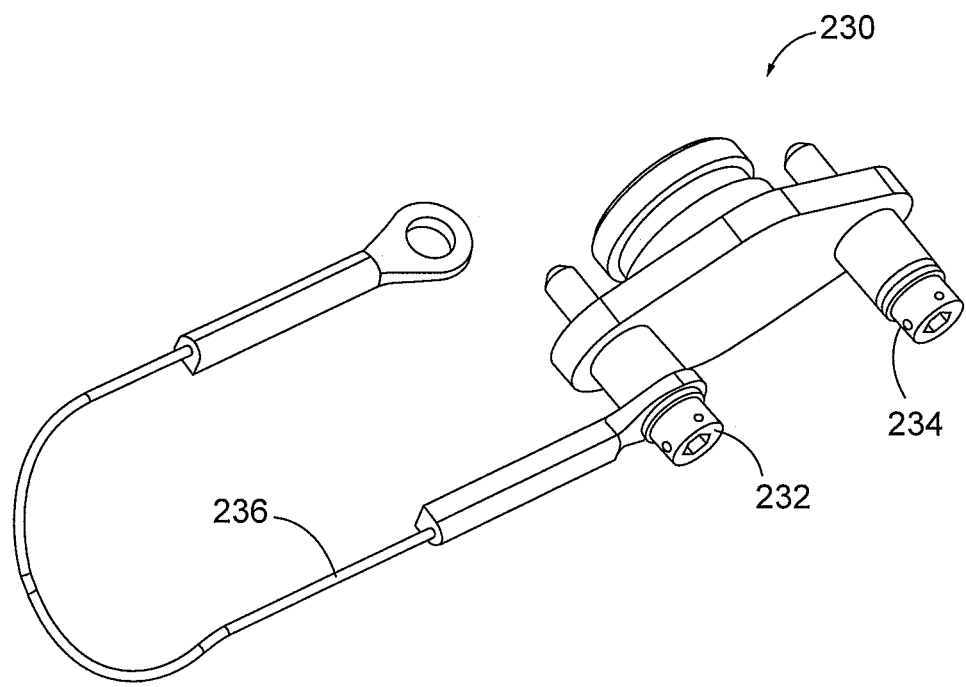
Figure 2G:
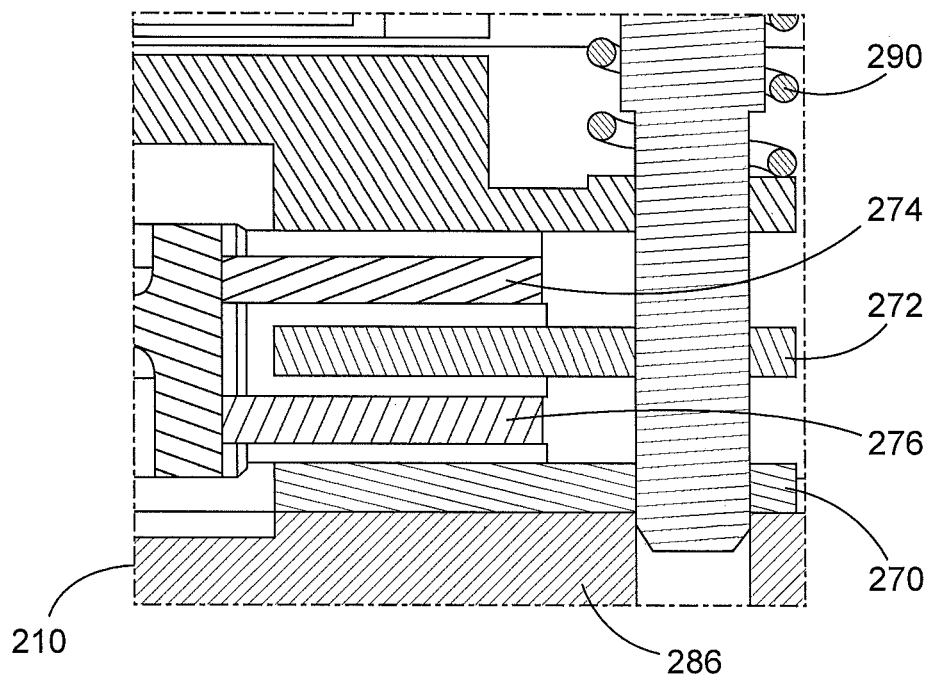
Figure 2H:
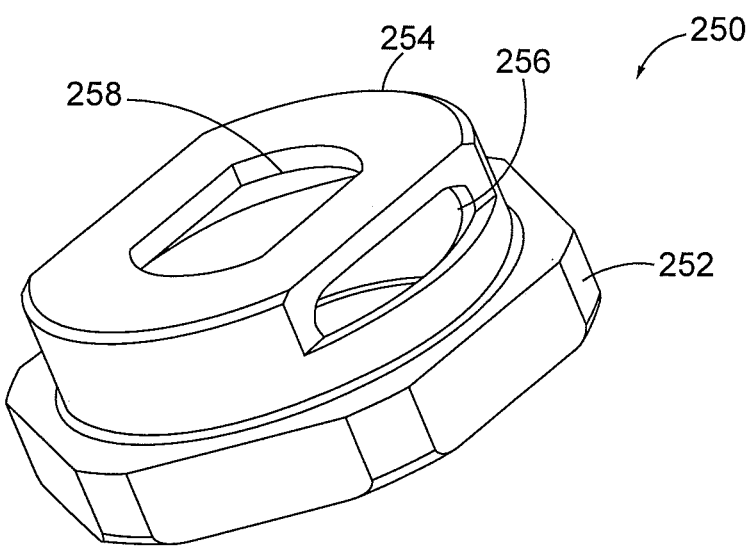

FIGS. 2A, 2B, 2C, 2D, 2E, 2F, 2G, and 2H illustrate an example line replaceable brake 200 as disclosed herein. In particular, FIGS. 2A and 2B show partial cutaway side elevations of the line replaceable brake 200 with the window cap 230 uninstalled (FIG. 2A) and installed (FIG. 2B). FIG. 2C shows a perspective view of the line replaceable brake 200, while FIG. 2D shows an exploded view of major components in the line replaceable brake 200. FIG. 2E depicts a perspective view of the housing 210 of the line replaceable brake 200, and FIG. 2F illustrates the window cap 230 and associated components. FIG. 2G shows a partial cutaway view of the line replaceable brake 200 focused on the arrangement of braking elements, and FIG. 2H provides a perspective view of locking nut 250.

The line replaceable brake 200 includes the housing 210 which mates with a core shell 212 to substantially define the outer contours of the line replaceable brake 200. The housing 210 and the core shell 212 form a modular construction to hold components of the line replaceable brake 200.

The connector 218 provides an interface between the line replaceable brake 200 and a motor or system to which the line replaceable brake 200 is mounted. In one aspect, the connector 218 may electrically connect components of the line replaceable brake 200 to the actuator 100. In one aspect, the connector 218 may electrically connect components of the line replaceable brake 200 to the actuator 100 to provide power and/or control to the line replaceable brake 200. In one aspect, the connector 218 is configured, structured, and arranged to extend into and connect to a corresponding connector (not shown) as the line replaceable brake 200 is attached to the actuator. This reduces the time of replacement maintenance.

The brake core 212 may house, an armature 224, and a coil 226. The brake core 212 can, in aspects, be a direct current coil winding core that generates a magnetic field. The housing 210 includes a window aperture 216, which in aspects may or may not include a transparent pane 214. The window aperture 216 is sealed or unsealed by a window cap 230. In operation, the window aperture 216 may be unsealed by removal of the window cap 230 in order to provide the ability for inspection by maintenance personnel as described in further detail below. Other major elements of the line replaceable brake 200 include a drive coupling 260, a bearing 240, and a locking nut 250.

Various internal elements are included within the housing 210 and/or the brake core 212 of the line replaceable brake 200. One or more disks for braking can be included. These can include, e.g., a static disk 270, a floating disk 272, and dynamic disks 274 and 276. In aspects employing the dynamic disks 274 and 276, the internal diameters of the dynamic disks 274 and 276 may be coupled with a motor shaft, either directly or via a linkage such as the drive coupling 260. The drive coupling 260 serves as a mechanical interface between a coupled motor (e.g., actuator 100) and the line replaceable brake 200. In other aspects, the line replaceable brake 200 may implement a single brake disc. In other aspects, the line replaceable brake 200 may implement other types of brake technology.

One or more of these disks can be observed through window aperture 216 to facilitate inspection by maintenance personnel without removal or disassembly of the line replaceable brake 200 or a system with which it is coupled (e.g., the actuator 100). Observation of the brake stacks (e.g., group of the static disk 270, the floating disk 272, and/or the dynamic disks 274 and 276) and air gap measurement allows faster inspection for friction material wear or other conditions impacting the operation, serviceability, or condition of the line replaceable brake 200.

Internal elements of the line replaceable brake 200 can also include one or more compression springs 290. While various aspects may include one or more springs, in the illustrated aspect four springs are provided at the corners (or symmetrically about the edges) of one or more of the static disk 270, the floating disk 272, and/or the dynamic disks 274 and 276 to provide even loading by the compression springs 290 on the one or more braking disks. Further, while this portion of the specification describes one or more compression springs 290, other components can be used. Non-compression springs can be used alone or in conjunction with one or more other springs in some arrangements. In alternative or complementary aspects, elastic members other than springs can be used.

Various hardware elements are also included on or in the housing 210 and/or the brake core 212 of the line replaceable brake 200. Such hardware elements can be used for assembly of the line replaceable brake 200, or to couple the line replaceable brake 200 to a system with which it operates (e.g., the actuator 100). Such hardware elements can include captive screws 292 and 292'. By utilizing the captive screws 292 and 292' as mounting hardware, foreign object debris risk can be mitigated. In other words, the captive screws 292 and 292' are configured to be held in the line replaceable brake 200 such that they are not easily separated from the same. In other aspects, the captive screws may be implemented with other types of mechanical fasteners including bolts, rivets, and the like. The line replaceable brake 200 can also include various seals, including seals 282, 284, and 286. In aspects, one or more seals can be an O-ring. The seals 282, 284, and 286 (and/or others) can provide environmentally sealed interfaces between, e.g., the housing 210 and the core shell 212, the window cap 230 and the housing 210, and/or the connector 218 and a coupled motor (e.g., actuator 100). Hardware can also include guide pin(s) 288. In an aspect, four guide pins 288 are included. In an aspect, the guide pins 288 can guide the armature 224, the floating disk 272, and/or the static disk 270.

Additional captive screws 232 and 234 can be used to retain the window cap 230 when obstructing the window aperture 216. Additional hardware associated with the window cap 230 can include window cap lanyard 236, which couples at one end with the window cap 230 and at the other end with one or both of the housing 210 and/or the brake core 212. In some aspects, the window cap lanyard 236 couples at one end with the window cap 230 via the captive screws 232 and at the other end with one or both of the housing 210 and/or the core shell 212 to the captive screws 292. This prevents both loss of the window cap 230 and risk of the window cap 230 or associated hardware becoming foreign object debris.

Further hardware coupled with the line replaceable brake 200 can include the bearing 240 and the locking nut 250. The bearing 240 can at least in part support the drive coupling 260 in aspects. In one aspect, the bearing 240 may be implemented with ball bearings. The locking nut 250 can also at least in part support the drive coupling 260. Aspects of the locking nut 250 can include a nut base 252, a nut boss 254, an inspection slot 256, and a collar 258. The inspection slot 256 can be used for gap inspection. Gap inspection using the inspection slot 256 can be used for shimming (e.g., for alignment with the drive coupling 260). The collar 258 can provide a locking feature by providing an orifice matched to the shaft cross-sectional shape of the coupled motor's rotor. While the collar 258 is shown to have a "Double-D" profile, this is for example and illustrative purposes only and other drive profiles can be utilized without deviating from the scope or spirit of the innovation. The locking nut 250 can include additional locking aspects, such as a radially deformed thread.

In operation, when electrical power is not present to the coil 226, the compression springs 290 force the armature 224 against the disk stack (which can include the static disk 270, the floating disk 272, and/or the dynamic disks 274 and 276). This pressure applies the brake to resist or stop rotation of a coupled motor. In aspects employing dynamic disks 274 and 276, when the dynamic disks 274 and 276 are compressed between the armature 224, the static disk 270 and the floating disk 272, the dynamic disks 274 and 276 cannot rotate and thus engage the line replaceable brake 200 brakes and limit rotation of the motor to which it is coupled. When electrical power is present to the coil 226, generates an electromagnetic force which overcomes the force of compression springs 290. This allows the armature 224 to release pressure on the disk stack (which can include the static disk 270, the floating disk 272, and/or the dynamic disks 274 and 276) thereby removing the brake. In aspects employing the dynamic disks 274 and 276, the dynamic disks 274 and 276 are free to rotate when the disk stack is not loaded by the compression springs 290, thereby allowing a coupled drive shaft to a motor to rotate. In an aspect, the dynamic disk 274 is located between the armature 224 and the floating disk 272, and the dynamic disk 276 is located between the floating disk 272 and the static disk 270. In an aspect, the dynamic disks 274 and 276 can include internal splines which engage external splines of the drive coupling 260.

Each time the line removable brake 200 is engaged or disengaged, the brake elements such as the armature 224, the static disk 270, the floating disk 272, and/or the dynamic disks 274 and 276 encounter friction and consequent heat causing material wear. Window aperture 216 and associated elements allow for air gap inspection to calculate the material wear on one or more of the armature 224, the static disk 270, the floating disk 272, and/or the dynamic disks 274 and 276.

Once driving elements are complete (e.g., the aircraft control surface reaches the intended position), the actuator must stop without significantly over-travelling. Here, the line replaceable brake stops the motor and holds its position. Because the braking elements of the line replaceable brake can be easily and regularly inspected, conclusions as to its serviceability can be made with greater confidence, thereby efficiently increasing the likelihood that the brake stops the motor within the specified number of revolutions to prevent over-travel of the motor and coupled components (e.g., aircraft control surfaces).

Various methodologies can be associated with use and management of a line replaceable brake. An aspect of such a methodology can include a method comprising visually inspecting a braking element through a window in an environmentally sealed line replaceable brake module mounted to an environmentally sealed motor. A further aspect can include, by visual inspection, determining the braking element is worn. A further aspect can include releasing a captive hardware element to dismount the environmentally sealed line replaceable brake module from the environmentally sealed motor. Thereafter, a new or refurbished line replaceable brake module may be attached to the environmentally sealed motor.

Accordingly, the disclosure has provided a line replaceable brake unit that overcomes typical brake wear issues (excessive coast, low holding torque, high release voltage, and the like) and the resultant irregular maintenance schedule and premature removal of the associated actuator for repair. The disclosure has provided a line replaceable brake unit that introduces an easy access check window for brake wear inspection to substantially reduce the risk of excessive brake friction material wear or premature removal. The disclosure has further set forth a quick and simple way to replace the brake without removing the entire actuator. Additionally, the disclosure has provided a component having access to inspect the friction material wear, specifically, to provide an actuator with a line replaceable brake unit which allows the brake wear to be easily inspected. The disclosure is further provided a replaceable brake for any electric motor requiring a brake, specifically, to provide an actuator with a line replaceable brake which can be easily removed and replaced with negligible risk of Foreign Object Debris (FOD).

Relative terms such as "below" or "above" or "upper" or "lower" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:
1. A system, comprising:
 a modular brake component having an integral brake housing configured to mount to a motor;

a drive coupling within the integral brake housing configured to mechanically couple with an output shaft of the motor;
one or more braking disks arranged in the integral brake housing configured to brake movement of the drive coupling when engaged;
an armature in the integral brake housing configured to engage or disengage the one or more braking disks with the drive coupling;
captive mounting hardware arranged in the integral brake housing and configured to mount the modular brake component directly on a back of one of the following: the motor or an actuator; and
an electrical connector arranged in the integral brake housing and configured to connect to a corresponding electrical connector on the back of one of the following: the motor or an actuator.

2. The system of claim 1, further comprising:
the motor and the motor is implemented in the actuator; and
the electrical connector is further configured provide an interface between the modular brake component and the actuator,
wherein the electrical connector is configured, structured, and arranged to extend into and connect to a corresponding connector as the modular brake component is attached to the actuator.

3. The system of claim 2, further comprising a gearbox operatively coupled with the motor,
wherein the electrical connector is further configured to electrically connect the modular brake component to the actuator to provide power and/or control to the modular brake component.

4. The system of claim 3,
wherein the combination of the motor and the gearbox is the actuator, and
wherein the modular brake component is configured as an electro-mechanical fail-safe brake for the actuator that is configured to stop the motor in an event of loss of electrical power to hold an output element of the motor or actuator in a given orientation, position, and/or rotational angle.

5. The system of claim 1, further comprising:
an inspection window through the integral brake housing aligned with at least a portion of a brake armature and a brake core.

6. The system of claim 5, further comprising a window cap configured to cover and seal the inspection window.

7. The system of claim 6, further comprising:
at least one captive fastener arranged in the window cap; and
a lanyard configured to be attached to the window cap at one end and the integral brake housing at another end.

8. The system of claim 1, further comprising a locking nut configured to couple with a rotor shaft of the modular brake component.

9. The system of claim 8, wherein the locking nut includes radially deformed threading.

10. The system of claim 8, wherein the locking nut is configured to lock against rotation relative to the output shaft via an internal anti-rotation feature; and wherein the locking nut comprises a hex-nut base, a nut boss, an inspection slot, and a collar.

11. The system of claim 10, wherein the internal anti-rotation feature comprises at least one of the following: a spline configuration or a non-circular configuration.

12. The system of claim 8, wherein the locking nut includes a gap check feature.

13. The system of claim 8, further comprising a bearing disposed between the locking nut and the drive coupling.

14. The system of claim 1, further comprising one or more captive fasteners,
wherein the one or more captive fasteners are configured to be held in the modular brake component.

15. The system of claim 1,
wherein the integral brake housing comprises at least one environmental seal;
wherein at least one of the motor and the actuator comprises at least one environmental seal; and
wherein the integral brake housing incorporates the at least one environmental seal in a mounting interface with the motor and the actuator, which when mated form a final assembled unit that is environmentally sealed.

16. The system of claim 1, further comprising:
a spring mechanically coupled to the armature combined with one or more separating springs between stationary disks in a combined arrangement, the combined arrangement being configured to:
reduce brake wear by maintaining a gap between at least one dynamic disk and at least one static disk during operation and to prolong a brake life; and
provide a non-linear force (low-to-high) to engage the modular brake component, which reduces impact loads on the system for improved reliability.

17. The system of claim 1, wherein the electrical connector is arranged with the integral brake housing, and wherein the electrical connector is configured to align and mate to a connector of the motor.

18. A method for implementing an actuator system, comprising:
providing a modular fail-safe brake component having an integral brake housing configured to mount to a motor;
providing a drive coupling within the integral brake housing configured to slip onto and mechanically couple with an output shaft of the motor;
providing an electrical connector for electrical interconnection concurrent with a mechanical mounting operation;
providing an environmental interfacial seal between the modular fail-safe brake component and the motor or a rotating device for sealing concurrent with the mechanical mounting operation;
providing an inspection window cap with an integral environmental seal, which completes a sealing of the actuator system concurrent with installation;
providing a dual spring configuration that is configured to prolong a brake life and increase reliability;
providing an inspection window in the integral brake housing aligned to facilitate inspection of braking elements by maintenance personnel without removal or disassembly of the modular fail-safe brake component to facilitate inspecting the braking elements through the inspection window in the integral brake housing;
determining at least one of the braking elements is worn;
providing captive fastening hardware elements to mount and dismount the modular fail-safe brake component from the motor; and
installing a new or refurbished modular brake component to the motor.

* * * * *